(12) United States Patent
Takahashi et al.

(10) Patent No.: US 11,550,103 B2
(45) Date of Patent: Jan. 10, 2023

(54) OPTICAL CONNECTION COMPONENT

(71) Applicant: FURUKAWA ELECTRIC CO., LTD., Tokyo (JP)

(72) Inventors: Masanori Takahashi, Tokyo (JP); Mitsuhiro Iwaya, Tokyo (JP); Masayoshi Tsukamoto, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/207,882

(22) Filed: Mar. 22, 2021

(65) Prior Publication Data

US 2021/0208338 A1 Jul. 8, 2021

Related U.S. Application Data

(63) Continuation of application No. PCT/JP2019/042928, filed on Oct. 31, 2019.

(30) Foreign Application Priority Data

Oct. 31, 2018 (JP) .............................. JP2018-205422

(51) Int. Cl.
 *G02B 6/255* (2006.01)
(52) U.S. Cl.
 CPC ................... *G02B 6/2551* (2013.01)
(58) Field of Classification Search
 CPC .................................................. G02B 6/2551
 See application file for complete search history.

(56) References Cited

U.S. PATENT DOCUMENTS 5,764,836 A 6/1998 Roff
6,317,555 B1 * 11/2001 Maron ................. G01L 9/0039
385/136

(Continued)

FOREIGN PATENT DOCUMENTS

CN 87101894 A 10/1987
CN 1106985 A 8/1995
(Continued)

OTHER PUBLICATIONS

International Search Report dated Jan. 28, 2020 in PCT/JP2019/042928 filed on Oct. 31, 2019, 2 pages.

(Continued)

*Primary Examiner* — Omar R Rojas
(74) *Attorney, Agent, or Firm* — Oblon, McClelland, Maier & Neustadt, L.L.P.

(57) ABSTRACT

An optical connection component includes an optical fiber; a high relative refractive-index difference optical fiber that is fusion-spliced to the optical fiber and has a greater relative refractive-index difference to a cladding of a core than the optical fiber; and an accommodating member accommodating the entire length of the optical fiber and the high relative refractive-index difference optical fiber, and has a first end face on which an end face of the optical fiber on the side opposite to the fusion-spliced side is exposed to be substantially flush with the first end face, and a second end face on which an end face of the high relative refractive-index difference optical fiber on the side opposite to the fusion-spliced side is exposed to be substantially flush with the second end face. The optical fiber and the high relative refractive-index difference optical fiber are fixed to the accommodating member.

5 Claims, 6 Drawing Sheets

(56) References Cited

U.S. PATENT DOCUMENTS

| | | | |
|---|---|---|---|
| 10,007,073 B2 | 6/2018 | Takahashi et al. | |
| 10,180,546 B2 | 1/2019 | Kondo et al. | |
| 2007/0196053 A1 | 8/2007 | Kewitsch | |
| 2017/0199341 A1* | 7/2017 | Takahashi | G02B 6/4249 |
| 2019/0154925 A1* | 5/2019 | Kondo | G02B 6/421 |

FOREIGN PATENT DOCUMENTS

| | | |
|---|---|---|
| CN | 101398515 A | 4/2009 |
| CN | 107003488 A | 8/2017 |
| JP | 6-289236 A | 10/1994 |
| JP | 2000-298219 A | 10/2000 |
| JP | 2003-255182 A | 9/2003 |
| JP | 2012-230399 A | 11/2012 |
| JP | 2016-126339 A | 7/2016 |
| JP | 6089147 B2 | 3/2017 |
| JP | 2017-161557 A | 9/2017 |
| JP | 2019-174699 A | 10/2019 |
| WO | WO 2016/013267 A1 | 1/2016 |

OTHER PUBLICATIONS

Japanese Notice of Reasons for Refusal dated Apr. 27, 2021 in Patent Application No. 2018-205422 (with unedited computer-generated English translation), 8 pages.

Chinese Office Action dated Jul. 12. 2022, in Patent Application No. 201980068579.6 w/English translation of cover page and English machine translation of the main body thereof.

* cited by examiner

OPTICAL CONNECTION COMPONENT

CROSS-REFERENCE TO RELATED APPLICATION(S)

This application is a continuation of International Application No. PCT/JP2019/042928, filed on Oct. 31, 2019 which claims the benefit of priority of the prior Japanese Patent Application No. 2018-205422, filed on Oct. 31, 2018, the entire contents of which are incorporated herein by reference.

BACKGROUND

The present disclosure relates to an optical connection component.

In the related art, in an optical waveguide constituting an optical element such as a planar lightwave circuit (PLC), a silicon waveguide chip, and the like, reduction of the connection loss between the relevant optical waveguide and an optical fiber to optically connect has been mentioned as one of the issues. For this reduction of the connection loss, there is a need to reduce the mismatch of an MFD (Mode Field Diameter) between the optical waveguide, for which the MFD is extremely small relative to the connecting optical fiber, and the relevant connecting optical fiber. The MFD of the connecting optical fiber is, for example, approximately 10 µm at a wavelength of 1550 nm, and the MFD of the optical waveguide is, for example, less than or equal to 0.5 µm at a wavelength of 1550 nm.

As a technique for this purpose, an optical connection component that fusion-splices a high relative refractive-index difference optical fiber, for which a relative refractive-index difference to the cladding of a core is greater than the connecting optical fiber, to the connecting optical fiber and connects the optical waveguide of the optical element and the connecting optical fiber via this high relative refractive-index difference optical fiber has been disclosed (see Japanese Patent No. 6089147, for example). Normally, as the MFD of a high relative refractive-index difference optical fiber is closer to the MFD of the optical waveguide than the MFD of the connecting optical fiber and can be made to be, for example, 3 µm to 5 µm, by interposing the high relative refractive-index difference optical fiber between the connecting optical fiber and the optical waveguide, the connection loss can be reduced.

As the above-described optical element having the optical waveguide of a small mode field diameter is usually formed in small form, the optical connection component used together with this optical element also needs to be downsized. However, it is also important to maintain high reliability at the same time as downsizing.

SUMMARY

There is a need for providing an optical connection component which can achieve both compact size and high reliability at the same time.

According to an embodiment, an optical connection component includes: an optical fiber; a high relative refractive-index difference optical fiber that is fusion-spliced to the optical fiber and has a greater relative refractive-index difference to a cladding of a core than the optical fiber; and an accommodating member accommodating the entire lengths of the optical fiber and the high relative refractive-index difference optical fiber, the accommodating member having a first end face on which an end face of the optical fiber on a side opposite to a side of the fusion-spliced is exposed to be substantially flush with the first end face, and a second end face on which an end face of the high relative refractive-index difference optical fiber on a side opposite to a side off the fusion-spliced is exposed to be substantially flush with the second end face. Further, the optical fiber and the high relative refractive-index difference optical fiber are fixed to the accommodating member in a longitudinal direction.

DETAILED DESCRIPTION

With reference to the accompanying drawings, the following describes exemplary embodiments of the present disclosure in detail. The present disclosure, however, is not intended to be limited by the embodiments described in the following. In the description of the drawings, identical or corresponding constituent elements are denoted by identical reference signs as appropriate, and redundant explanations are omitted as appropriate. Furthermore, it needs to note that the drawings are schematic and that the relation of dimensions of each element, the ratio of each element, and the like may differ from reality. In addition, XYZ coordinate axes are indicated in the drawings as appropriate, thereby describing the directions. Moreover, even between the drawings, portions that the relation and ratio of dimensions are different from each other may be included. For terms not specifically defined in the present specification, the definitions and measurement methods in ITU-T (International Telecommunication Union) G.650.1 and G.650.2 are followed as appropriate.

First Embodiment

Figure 1:
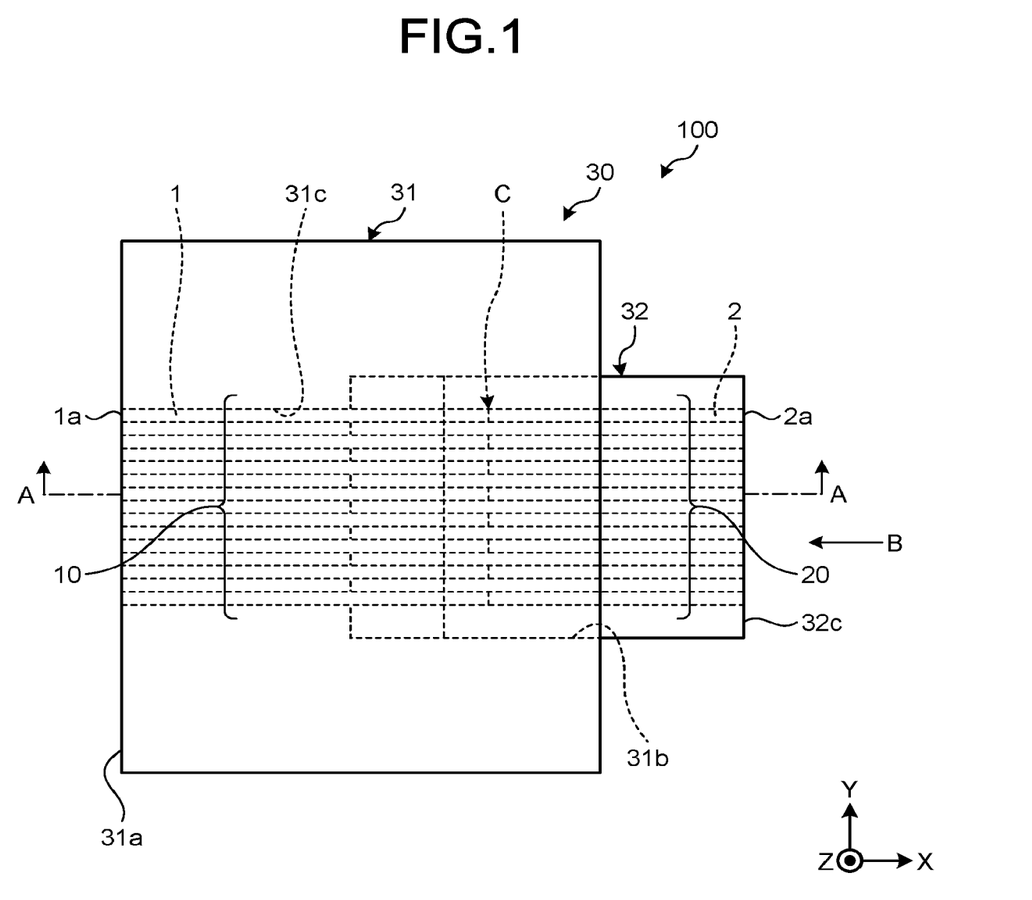
FIG. 1 is a schematic top view of an optical connection component according to a first embodiment.
Figure 2:
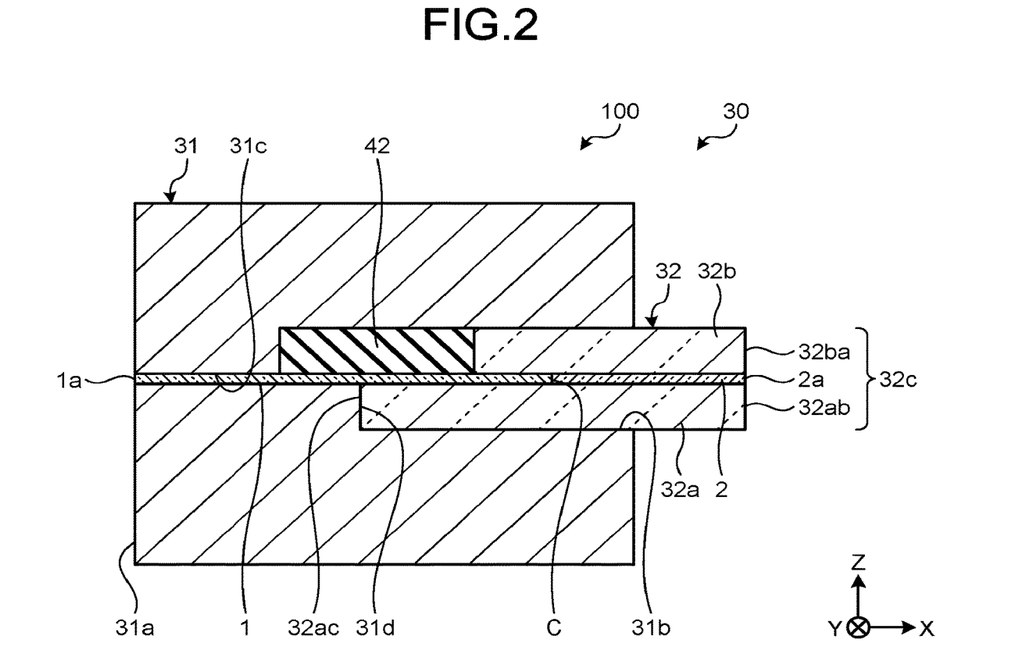
FIG. 2 is a cross-sectional view taken along the line A-A of the optical connection component illustrated in FIG. 1.
Figure 3:
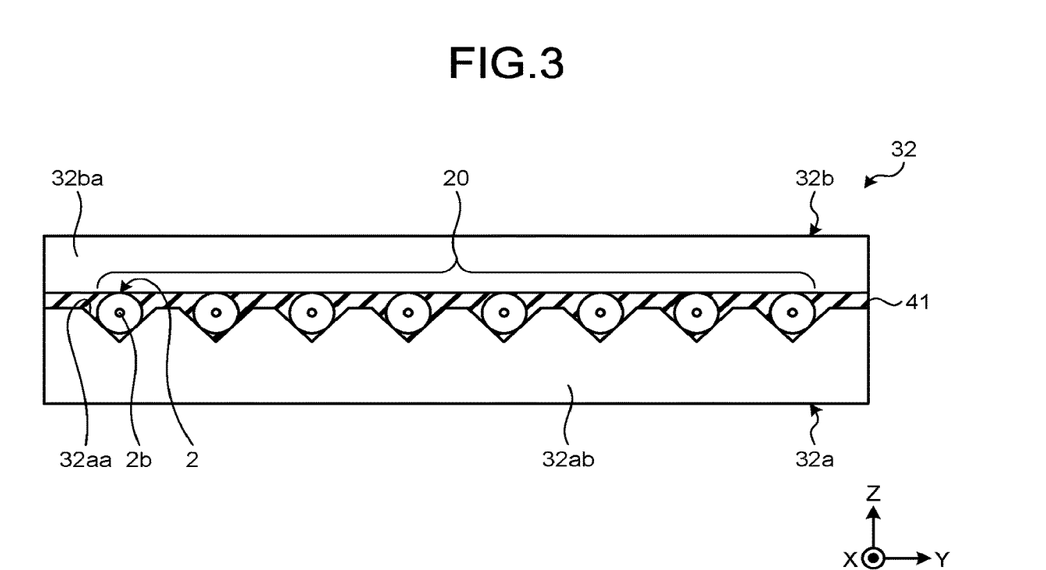
FIG. 3 is an end view seen from the arrow B of the optical connection component illustrated in FIG. 1.

FIG. 1 is a schematic top view of an optical connection component according to a first embodiment. FIG. 2 is a cross-sectional view taken along the line A-A of the optical connection component illustrated in FIG. 1. FIG. 3 is an end view seen from the arrow B of the optical connection component illustrated in FIG. 1. An optical connection component 100 includes an optical fiber group 10, an optical fiber group 20, and an accommodating member 30.

The optical fiber group 10 includes a plurality of standard optical fibers 1. In the first embodiment, the number of the standard optical fibers 1 is eight but is not particularly limited. The standard optical fiber 1 conforms to the specifications of the standard single-mode optical fiber defined in ITU-T G.652. That is, the standard optical fiber 1 is a single-mode optical fiber having a zero-dispersion wavelength in a 1.3 μm band. In the standard optical fiber 1, the relative refractive-index difference to the cladding of a core (hereinafter may be described simply as relative refractive-index difference) is approximately 0.3% and the mode field diameter at a wavelength of 1550 nm is 10 μm to 11 μm.

The relative refractive-index difference (Δ) to the cladding of the core is a numerical value determined by the following expression.

$$\Delta = \{(n_c - n_{cl})/n_c\} \times 100$$

In this expression, $n_c$ is a maximum refractive index and $n_{cl}$ is a refractive index of the cladding.

The optical fiber group 20 includes a plurality of high relative refractive-index difference optical fibers 2. In the first embodiment, the number of the high relative refractive-index difference optical fibers 2 is eight but is not particularly limited. The high relative refractive-index difference optical fiber 2 has a greater relative refractive-index difference than that of the standard optical fiber 1. For example, the high relative refractive-index difference optical fiber 2 has the relative refractive-index difference of 2.0% or higher and 3.0% or smaller and has the mode field diameter of 3.0 μm or larger and 5.0 μm or smaller at a wavelength of 1550 nm. One end face of each high relative refractive-index difference optical fiber 2 is fusion-spliced to one end face of each standard optical fiber 1 at a fusion-splicing point C.

In the first embodiment, each standard optical fiber 1 and each high relative refractive-index difference optical fiber 2 are glass optical fibers having no resin sheath. For example, each standard optical fiber 1 and each high relative refractive-index difference optical fiber 2 are made up of quartz-based glass.

Each high relative refractive-index difference optical fiber 2 and each standard optical fiber 1 are fusion-spliced so that the connection loss is kept low by smoothing the change in the mode field diameter at the fusion-splicing point C by devising the heating conditions at the time of fusion-splicing such as applying Thermally diffused Expanded Core (TFC) fusion, for example. Consequently, it is preferable that the connection loss at the fusion-splicing point C be reduced to a connection loss of less than or equal to 0.1 dB.

The accommodating member 30 includes a ferrule 31 and a fixing member 32. The ferrule 31 has a rectangular parallelepiped shape and is made of resin, glass, ceramic, and the like, for example. The ferrule 31 is an MT ferrule, for example. The ferrule 31 has a first end face 31a forming one surface of the rectangular parallelepiped shape. The ferrule 31 further has a recessed portion 31b formed on the surface facing the first end face 31a. On the first end face 31a, eight accommodating holes 31c communicating with the recessed portion 31b are formed extending in the X direction and being juxtaposed in the Y direction. The distance between two adjacent accommodating holes 31c is 250 μm, for example.

A part of each standard optical fiber 1 in the longitudinal direction is accommodated in each accommodating hole 31c and is fixed with an adhesive and the like that is filled in a slight gap between the inner wall of the accommodating hole 31c and the outer peripheral surface of each standard optical fiber 1. An end face 1a of each standard optical fiber 1 on the side opposite to the side that is fusion-spliced at the fusion-splicing point C is exposed on the first end face 31a so as to be substantially flush therewith.

The fixing member 32 includes a first member 32a and a second member 32b. The first member 32a is a flat plate-shaped member. On the main surface of the first member 32a in the Z direction, eight V-grooves 32aa extending over both end faces in the X direction are formed being juxtaposed in the Y direction. The distance between two adjacent V-grooves 32aa is 250 μm, for example.

The entire length of each high relative refractive-index difference optical fiber 2, a part of each standard optical fiber 1 in the longitudinal direction, and each fusion-splicing point C are placed on the V-groove 32aa.

The second member 32b is a flat plate-shaped member having a length in the Y direction substantially the same as that of the first member 32a and having a length in the X direction slightly shorter than that of the first member 32a. The second member 32b clamps, between the first member 32a and the second member 32b, the entire length of each high relative refractive-index difference optical fiber 2, a part of the standard optical fiber 1 in the longitudinal direction, and each fusion-splicing point C. The gap between the first member 32a and the second member 32b is filled with an adhesive 41. As a result, the entire length of each high relative refractive-index difference optical fiber 2 and a part of each standard optical fiber 1 in the longitudinal direction, which are clamped between the first member 32a and the second member 32b, are fixed to the fixing member 32.

An end face 32ab located on the positive side in the X direction of the first member 32a and an end face 32ba located on the positive side in the X direction of the second member 32b are substantially flush with each other and constitute a second end face 32c of the fixing member 32. An end face 2a of each high relative refractive-index difference optical fiber 2 on the opposite side to the side that is fusion-spliced at the fusion-splicing point C is exposed on the second end face 32c so as to be substantially flush therewith.

The first member 32a and the second member 32b are made of quartz-based glass. However, the constituent materials of the first member 32a and the second member 32b are not limited to glass and may be materials for which the physical properties (such as a linear expansion coefficient) are close to them so as not to impart unnecessary stress to each standard optical fiber 1 and each high relative refractive-index difference optical fiber 2.

The end portions on the opposite side to the second end face 32c of the fixing member 32 are arranged in the recessed portion 31b of the ferrule 31, and the ferrule 31 and the fixing member 32 are fitted together. At this time, an end face 32ac facing the end face 32ab of the first member 32a abuts a bottom surface 31d of the recessed portion 31b of the ferrule 31. The gap that is present among the ferrule 31, the fixing member 32, and a part of each standard optical fiber 1 in the longitudinal direction is filled with an adhesive 42, filling the relevant gap and fixing the components together.

As a result, each standard optical fiber 1 and each high relative refractive-index difference optical fiber 2 are fixed to the accommodating member 30 in the longitudinal direction, and the entire length is accommodated in a straight line.

Figure 4:
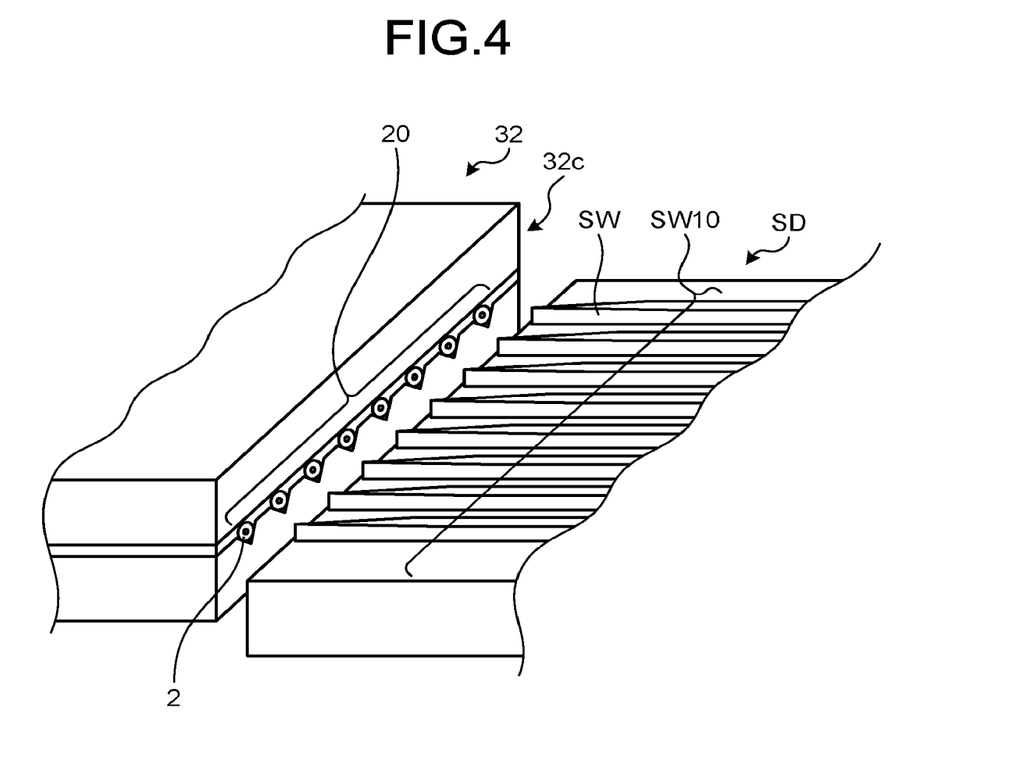
FIG. 4 is a schematic diagram illustrating a usage form of the optical connection component illustrated in FIG. 1.

This optical connection component 100 is used in the following manner, for example. First, the ferrule 31 side is connected to an eight-core optical fiber core wire with connector for which a ferrule of the same type as the ferrule 31 (for example, an MT ferrule) is provided on the end portion of an eight-core standard single-mode optical fiber. The fixing member 32 side is, as illustrated in FIG. 4, arranged such that the second end face 32c faces the end face of a silicon waveguide chip SD, and is connected to each other with an adhesive and the like. The silicon waveguide chip SD includes a silicon waveguide group SW10. The silicon waveguide group SW10 includes eight ridge-type silicon waveguides SW. At the distal end portion of each silicon waveguide SW, a spot-size conversion structure is formed. The MFD of each silicon waveguide SW is, for example, less than or equal to 0.5 μm at a wavelength of 1550 nm, but is expanded up to approximately 3 μm at the distal end portion by the spot-size conversion structure. Each high relative refractive-index difference optical fiber 2 of the optical fiber group 20 is connected to each silicon waveguide SW of the silicon waveguide group SW10.

By using this optical connection component 100, each optical fiber of the eight-core optical fiber core wire with connector can be connected to each standard optical fiber 1 at a low connection loss. In addition, each standard optical fiber 1 can be connected to each silicon waveguide SW via each high relative refractive-index difference optical fiber 2 at a low connection loss. Thus, each optical fiber of the eight-core optical fiber core wire with connector can be connected to each silicon waveguide SW at a low connection loss and the connection loss can be made to be less than or equal to 1 dB, for example.

Furthermore, because the entire lengths of each standard optical fiber 1 and each high relative refractive-index difference optical fiber 2 are accommodated in the accommodating member 30, the optical connection component 100 can be downsized. In addition, because each standard optical fiber 1 and each high relative refractive-index difference optical fiber 2 are fixed to the accommodating member 30 in the longitudinal direction, each standard optical fiber 1, each high relative refractive-index difference optical fiber 2, and the fusion-splicing points C do not move with respect to the accommodating member 30 even if impact is received from the outside. As a result, the optical connection component 100 has high mechanical strength and high reliability.

In particular, in the optical connection component 100, the end portions of the fixing member 32 are arranged in the recessed portion 31b of the ferrule 31, and the ferrule 31 and the fixing member 32 are fitted together. As a result, the lengths of the optical connection component 100 in the Y direction and the Z direction can be approximately the same as those of the ferrule 31. For example, because a typical eight-core MT ferrule has a length of 6.4 mm in the Y direction and a length of 2.5 mm in the Z direction, the lengths of the optical connection component 100 in the Y direction and the Z direction can also be approximately the same.

In the optical connection component 100, the first end face 31a and the second end face 32c face each other and one end face is equivalent to the opposing end face of the other. In the optical connection component 100, because the entire lengths of each standard optical fiber 1 and each high relative refractive-index difference optical fiber 2 are accommodated in the accommodating member 30, the distance between the first end face 31a and the second end face 32c, that is, the length of the optical connection component 100 in the X direction can be downsized to a length of less than or equal to 20 mm.

Furthermore, when the optical connection component 100 is connected to the silicon waveguide chip SD as in FIG. 4, the silicon waveguide chip SD may subsequently undergo a reflow process in a high-temperature environment of 250° C. or higher and 300° C. or lower, for example, and in that case, the optical connection component 100 is also exposed to a high-temperature environment. However, in the optical connection component 100, because each standard optical fiber 1 and each high relative refractive-index difference optical fiber 2 are glass optical fibers having no resin sheath, the degradation of resin sheath does not occur even in such a high-temperature environment. Furthermore, in the optical connection component 100, in the first place, because the entire lengths of each standard optical fiber 1 and each high relative refractive-index difference optical fiber 2 are accommodated in the accommodating member 30, the resin sheath for protection from the outside is not particularly needed. In addition, with a resin sheath formed on each standard optical fiber 1 and each high relative refractive-index difference optical fiber 2, when the standard optical fiber 1 and the high relative refractive-index difference optical fiber 2 are exposed to a high-temperature environment and the resin sheath is degraded, the displacement of each standard optical fiber 1 and each high relative refractive-index difference optical fiber 2 in the accommodating member 30 may occur due to a reduction in the volume of the resin sheath, or the like. However, if each standard optical fiber 1 and each high relative refractive-index difference optical fiber 2 are glass optical fibers having no resin sheath, the problem of displacement does not occur.

If there is a possibility of being exposed to a high-temperature environment as in the foregoing, it is preferable that the adhesive for fixing each standard optical fiber 1 to the ferrule 31 and the adhesives 41 and 42 have high heat resistance, and both are thermosetting epoxy resin-based adhesives, for example. In the first embodiment, because the first member 32a and second member 32b are made of quartz-based glass, the adhesive 41 may be an ultraviolet-curing resin adhesive.

Manufacturing Method

Figure 5A:
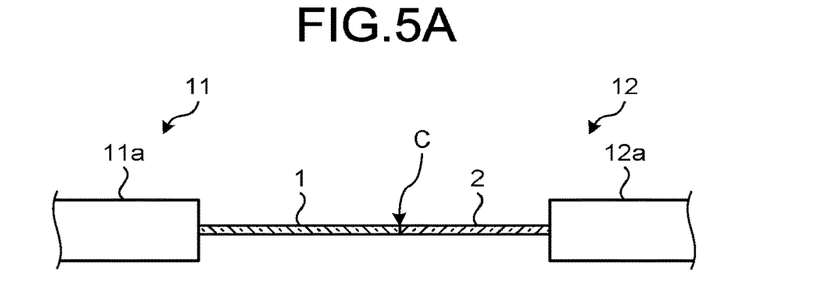
FIG. 5A is an explanatory diagram of one example of a manufacturing method of the optical connection component illustrated in FIG. 1.

Next, one example of a manufacturing method of the optical connection component 100 will be described with reference to FIG. 5A to FIG. 5D. First, as illustrated in FIG. 5A, prepared are eight optical fiber strands 11 each having a resin sheath 11a formed on the outer circumference of the standard optical fiber 1 that is a glass optical fiber and eight optical fiber strands 12 each having a resin sheath 12a formed on the outer circumference of the high relative refractive-index difference optical fiber 2 that is a glass optical fiber. Subsequently, in the optical fiber strands 11 and 12, the resin sheaths 11a and 12a, respectively, are removed to expose the standard optical fiber 1 and the high relative refractive-index difference optical fiber 2 of predetermined lengths. Then, the end faces of the standard optical fiber 1 and the high relative refractive-index difference optical fiber 2 are fusion-spliced to form the fusion-splicing point C. This process is performed on eight each of the fibers. Note that, by preparing eight-core tape core wires respectively formed of a set of eight fiber strands 11 and a set of eight optical fiber strands 12 including the high relative refractive-index difference optical fiber 1, those eight-core tape core wires may be fusion-spliced at once.

Figure 5B:
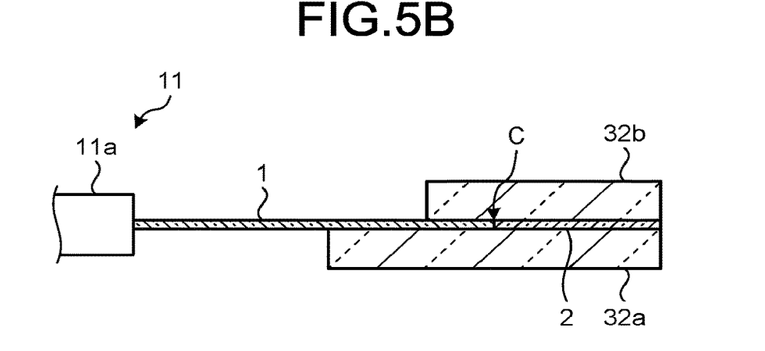
FIG. 5B is an explanatory diagram of one example of the manufacturing method of the optical connection component illustrated in FIG. 1.

Subsequently, as illustrated in FIG. 5B, each high relative refractive-index difference optical fiber 2 is cut in a predetermined length from the fusion-splicing point C at the location where there is no resin sheath 12a, and the entire length of each high relative refractive-index difference optical fiber 2, the fusion-splicing point C, and a part of each standard optical fiber 1 in the longitudinal direction are clamped with the first member 32a and the second member 32b and bonded with the adhesive 41. At this time, the end face of each high relative refractive-index difference optical fiber 2 may slightly protrude from the second end face 32c of the fixing member 32.

Figure 5C:
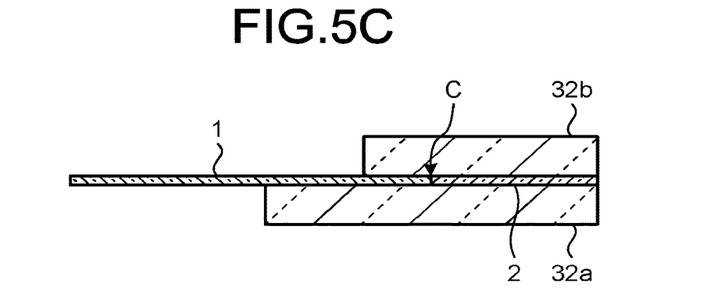
FIG. 5C is an explanatory diagram of one example of the manufacturing method of the optical connection component illustrated in FIG. 1.

Then, as illustrated in FIG. 5C, each standard optical fiber 1 is cut in a predetermined length from the fusion-splicing point C at the location where there is no resin sheath 11a.

Figure 5D:
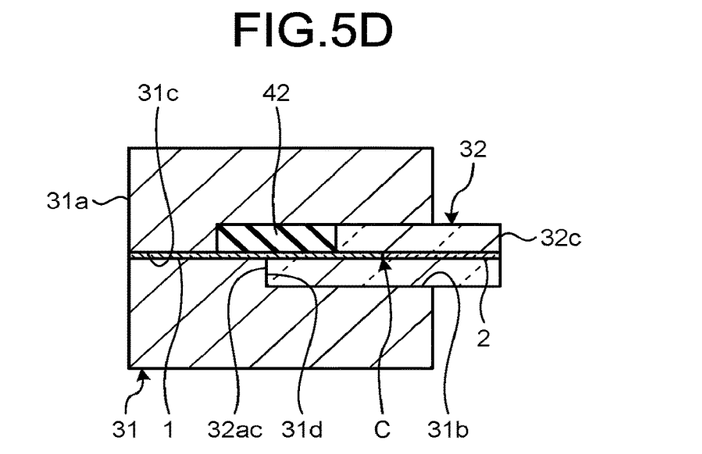
FIG. 5D is an explanatory diagram of one example of the manufacturing method of the optical connection component illustrated in FIG. 1.

Subsequently, as illustrated in FIG. 5D, each standard optical fiber 1 is inserted into each accommodating hole 31c of the ferrule 31, and the fixing member 32 is inserted into the recessed portion 31b of the ferrule 31 until the end face 32ac abuts the bottom surface 31d. Thus, the size of the recessed portion 31b at the Y-Z cross-section is slightly larger than the size of the fixing member 32 at the Y-Z cross-section. At this time, the end face of each standard optical fiber 1 may slightly protrude from the first end face 31a of the ferrule 31. Then, the gap that is present among the ferrule 31, the fixing member 32, and a part of each standard optical fiber 1 in the longitudinal direction is filled with the adhesive 42, and the components are fixed together. Thereafter, the first end face 31a and the second end face 32c are ground. Thereafter, by performing a predetermined process, the optical connection component 100 is completed.

Second Embodiment

Figure 6:
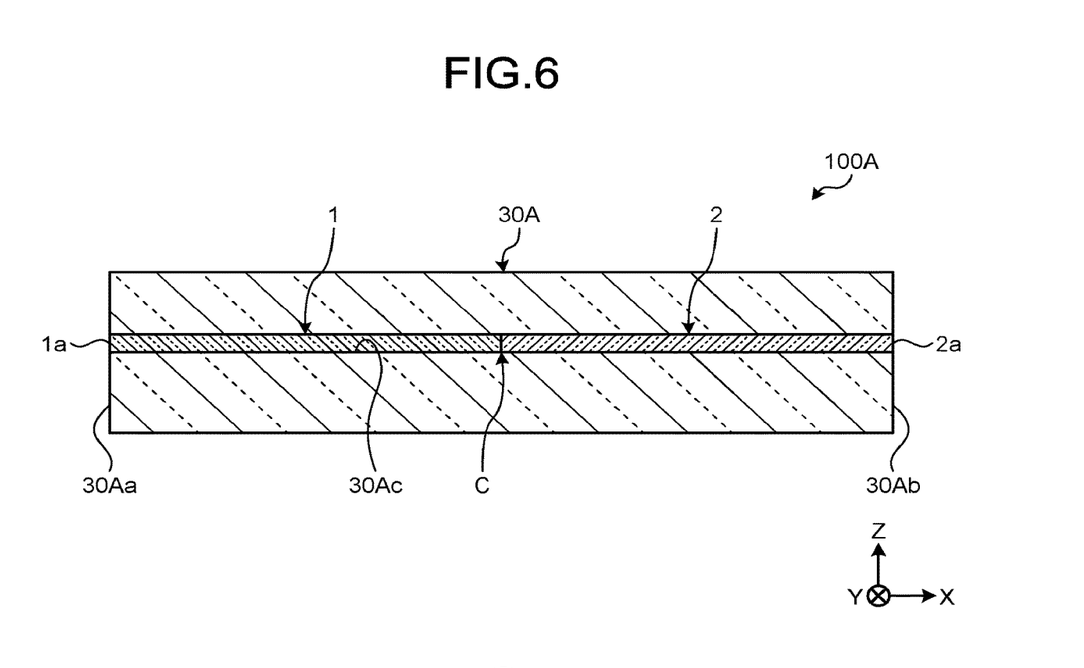
FIG. 6 is a schematic cross-sectional view of an optical connection component according to a second embodiment.

FIG. 6 is a schematic cross-sectional view of an optical connection component according to a second embodiment. An optical connection component 100A includes a plurality of standard optical fibers 1, a plurality of high relative refractive-index difference optical fibers 2, and an accommodating member 30A. Each standard optical fiber 1 and each high relative refractive-index difference optical fiber 2 are glass optical fibers having no resin sheath, and one end face of each standard optical fiber 1 and one end face of each high relative refractive-index difference optical fiber 2 are fusion-spliced at the fusion-splicing point C.

The accommodating member 30A is a block body having a rectangular parallelepiped shape and is made of resin, glass, ceramic and the like, for example. The accommodating member 30A is substantially parallel to the Y-Z plane and has a first end face 30Aa and a second end face 30Ab facing each other. In addition, the accommodating member 30A is opened to the first end face 30Aa and the second end face 30Ab and has a plurality of accommodating holes 30Ac extending in the X direction and being juxtaposed in the Y direction.

Each standard optical fiber 1 and each high relative refractive-index difference optical fiber 2 that are fusion-spliced are accommodated in each accommodating hole 30Ac by insertion and the like, and the entire lengths thereof are accommodated in the accommodating member 30A. Each standard optical fiber 1 and each high relative refractive-index difference optical fiber 2 are fixed with an adhesive and the like filled in a slight gap between the inner wall of each accommodating hole 30Ac and the outer peripheral surfaces of each standard optical fiber 1 and each high relative refractive-index difference optical fiber 2. That is, each standard optical fiber 1 and each high relative refractive-index difference optical fiber 2 are fixed to the accommodating member 30A in the longitudinal direction.

The end face 1a of each standard optical fiber 1 is exposed on the first end face 30Aa so as to be substantially flush therewith. The end face 2a of each high relative refractive-index difference optical fiber 2 is exposed on the second end face 30Ab so as to be substantially flush therewith.

As with the case of the first embodiment, if this optical connection component 100A is used, each optical fiber of a multi-core optical fiber core wire with connector can be connected to each silicon waveguide SW of the silicon waveguide chip SD at a low connection loss and the connection loss can be made to be less than or equal to 1 dB, for example.

Furthermore, because the entire lengths of each standard optical fiber 1 and each high relative refractive-index difference optical fiber 2 are accommodated in the accommodating member 30A, the optical connection component 100A can be downsized. As each standard optical fiber 1 and each high relative refractive-index difference optical fiber 2 are fixed to the accommodating member 30A in the longitudinal direction, the mechanical strength is high, and the reliability is high.

In addition, in the optical connection component 100A, because the accommodating member 30A is made up of a single block body, the size can be made substantially equal to or less than that of the MT ferrule, for example. In particular, the distance between the first end face 30Aa and the second end face 30Ab, that is, the length of the optical connection component 100A in the X direction can be downsized to a length of less than or equal to 20 mm.

The optical connection component 100A does not cause the deterioration of the resin sheath even in a high-temperature environment. If there is a possibility of being exposed to a high-temperature environment, it is preferable that the adhesive used have high heat resistance as in the foregoing.

Furthermore, the accommodating member 30A having a plurality of accommodating holes 30Ac in such a manner may be fabricated by molding such as an injection molding or may be fabricated by forming the accommodating holes in the block body in a mechanical or chemical manner. The accommodating member 30A may be formed by combining a plurality of block bodies for which the grooves that form the shape of the accommodating holes when combined are formed on the surface. When the accommodating member 30A is formed by combining the block bodies, each standard optical fiber 1 and each high relative refractive-index difference optical fiber 2 may be inserted to each accommodating hole 30Ac after the shape of each accommodating hole 30Ac is completed, or each of the block bodies may be assembled to each standard optical fiber 1 and each high relative refractive-index difference optical fiber 2.

Third Embodiment

Figure 7:
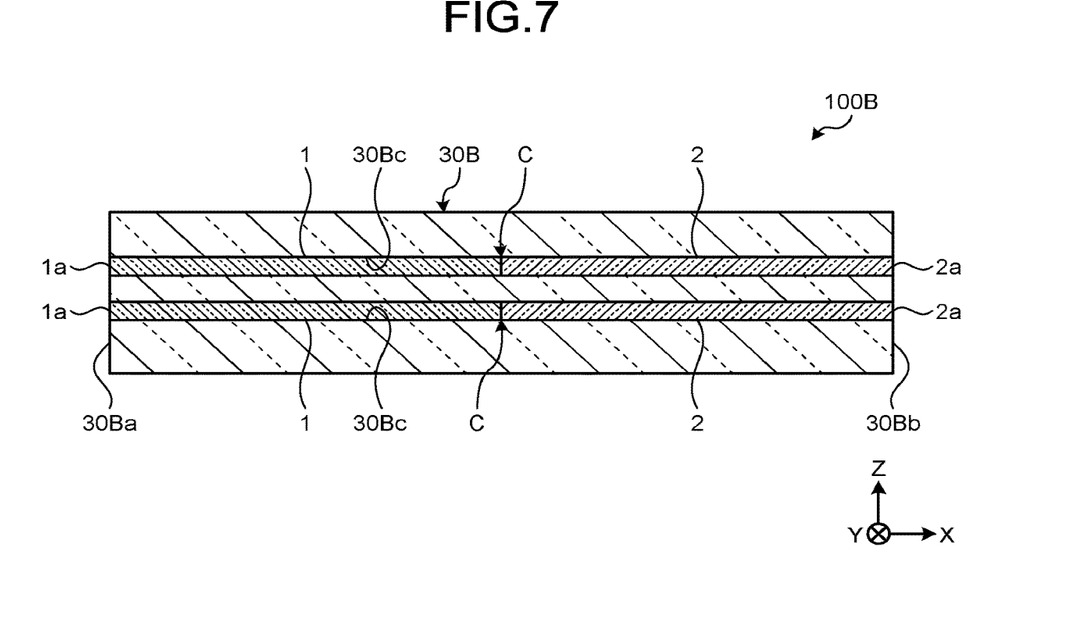
FIG. 7 is a schematic cross-sectional view of an optical connection component according to a third embodiment.

FIG. 7 is a schematic cross-sectional view of an optical connection component according to a third embodiment. An optical connection component 100B includes a plurality of standard optical fibers 1, a plurality of high relative refractive-index difference optical fibers 2 as many as the standard optical fibers 1, and an accommodating member 30B. Each standard optical fiber 1 and each high relative refractive-index difference optical fiber 2 are glass optical fibers having no resin sheath, and one end face of each standard optical fiber 1 and one end face of each high relative refractive-index difference optical fiber 2 are fusion-spliced at the fusion-splicing point C.

The accommodating member 30B is a block body having a rectangular parallelepiped shape and is made of resin, glass, ceramic and the like, for example. The accommodating member 30B is substantially parallel to the Y-Z plane and has a first end face 30Ba and a second end face 30Bb facing each other. In addition, the accommodating member 30B is opened to the first end face 30Ba and the second end face 30Bb and has a plurality of accommodating holes 30Bc that extend in the X direction, are juxtaposed in the Y direction, and are arranged in two stages in the Z direction. The number of the accommodating holes 30Bc is equal to or greater than the number of the standard optical fibers 1 or the number of the high relative refractive-index difference optical fibers 2.

Each standard optical fiber 1 and each high relative refractive-index difference optical fiber 2 that are fusion-spliced are accommodated in each accommodating hole 30Bc by insertion and the like, and the entire lengths thereof are accommodated in the accommodating member 30B. Each standard optical fiber 1 and each high relative refractive-index difference optical fiber 2 are fixed with an adhesive and the like filled in a slight gap between the inner wall of each accommodating hole 30Bc and the outer peripheral surfaces of each standard optical fiber 1 and each high relative refractive-index difference optical fiber 2. That is, each standard optical fiber 1 and each high relative refractive-index difference optical fiber 2 are fixed to the accommodating member 30B in the longitudinal direction.

The end face 1a of each standard optical fiber 1 is exposed on the first end face 30Ba so as to be substantially flush therewith. The end face 2a of each high relative refractive-index difference optical fiber 2 is exposed on the second end face 30Bb so as to be substantially flush therewith.

If this optical connection component 100B is used, each optical fiber of a two-stage multi-core optical fiber core wire with connector can be connected to each silicon waveguide of a two-stage silicon waveguide chip at a low connection loss and the connection loss can be made to be less than or equal to 1 dB, for example.

Furthermore, the optical connection component 100B can achieve, as with the above-described embodiments, downsizing and high reliability. Because the standard optical fibers 1 and the high relative refractive-index difference optical fibers 2 can be arranged in two stages in the Z direction, the density of the core wires in the Y-Z cross-section can be increased. As just described, when accommodating the entire lengths of each standard optical fiber 1 and each high relative refractive-index difference optical fiber 2 in the accommodating member 30B, each standard optical fiber 1 and each high relative refractive-index difference optical fiber 2 can be laid out in the accommodating member 30B with a high degree of freedom.

In addition, the length of the optical connection component 100B in the X direction can be downsized to a length of less than or equal to 20 mm. The optical connection component 100B does not cause the deterioration of the resin sheath even in a high-temperature environment. If there is a possibility of being exposed to a high-temperature environment, it is preferable that the adhesive used have high heat resistance as in the foregoing. Such an accommodating member 30B can be fabricated in the same manner as the accommodating member 30A in the second embodiment.

Fourth Embodiment

Figure 8:
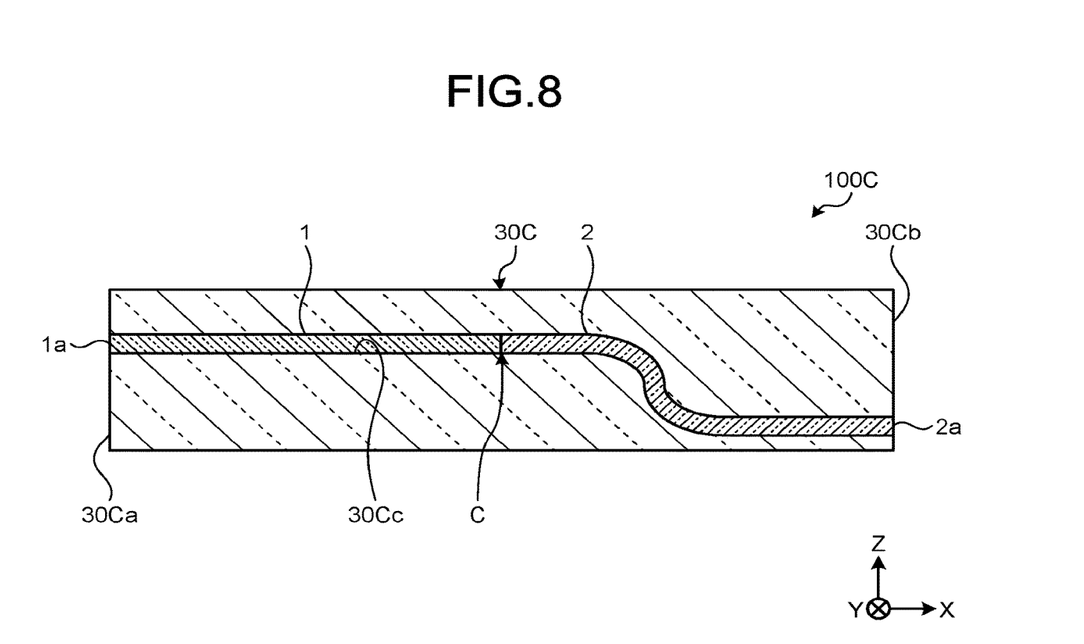
FIG. 8 is a schematic cross-sectional view of an optical connection component according to a fourth embodiment.

FIG. 8 is a schematic cross-sectional view of an optical connection component according to a fourth embodiment. An optical connection component 100C includes a plurality of standard optical fibers 1, a plurality of high relative refractive-index difference optical fibers 2 as many as the standard optical fibers 1, and an accommodating member 30C. Each standard optical fiber 1 and each high relative refractive-index difference optical fiber 2 are glass optical fibers having no resin sheath, and one end face of each standard optical fiber 1 and one end face of each high relative refractive-index difference optical fiber 2 are fusion-spliced at the fusion-splicing point C.

The accommodating member 30C is a block body having a rectangular parallelepiped shape and is made of resin, glass, ceramic, and the like, for example. The accommodating member 30C is substantially parallel to the Y-Z plane and has a first end face 30Ca and a second end face 30Cb facing each other. In addition, the accommodating member 30C is opened to the first end face 30Ca and the second end face 30Cb and has a plurality of accommodating holes 30Cc that are juxtaposed in the Y direction. In this case, each accommodating hole 30Cc first extends in the X direction from the first end face 30Ca, bends in an S-shape on the negative side of the Z direction on the way, and then extends in the X direction to reach the second end face 30Cb. As a result, the opening in the second end face 30Cb is located on the negative side of the Z direction with respect to the opening in the first end face 30Ca of the accommodating hole 30Cc. The number of the accommodating holes 30Cc is equal to or greater than the number of the standard optical fibers 1 or the number of the high relative refractive-index difference optical fibers 2.

Each standard optical fiber 1 and each high relative refractive-index difference optical fiber 2 that are fusion-spliced are accommodated in each accommodating hole 30Cc by insertion and the like, and the entire lengths thereof are accommodated in the accommodating member 30C. Each standard optical fiber 1 and each high relative refractive-index difference optical fiber 2 are fixed with an adhesive and the like filled in a slight gap between the inner wall of each accommodating hole 30Cc and the outer peripheral surfaces of each standard optical fiber 1 and each high relative refractive-index difference optical fiber 2. That is, each standard optical fiber 1 and each high relative refractive-index difference optical fiber 2 are fixed to the accommodating member 30C in the longitudinal direction. In this case, because each accommodating hole 30Cc is bent inside the accommodating member 30C, at least one of each standard optical fiber 1 and each high relative refractive-index difference optical fiber 2 is also bent accordingly. In the fourth embodiment, it is configured such that each high relative refractive-index difference optical fiber 2 for which the bending radius at which bending loss occurs is smaller is bent. As a result, the curvature radius of the bend can be made small, making it suitable for downsizing the optical connection component 100C.

The end face 1a of each standard optical fiber 1 is exposed on the first end face 30Ca so as to be substantially flush therewith. The end face 2a of each high relative refractive-index difference optical fiber 2 is exposed on the second end face 30Cb so as to be substantially flush therewith. As in the foregoing, the locations of each end face 1a and each end face 2a in the Z direction are different from each other.

If this optical connection component 100C is used, each optical fiber of a multi-core optical fiber core wire with connector can be connected to each silicon waveguide of a silicon waveguide chip at a low connection loss and the connection loss can be made to be less than or equal to 1 dB, for example. In addition, because the locations of each end face 1a and each end face 2a in the Z direction are different from each other, the optical connection component 100C also has a function of height direction conversion that converts the connecting location in the Z direction. As just described, when accommodating the entire lengths of each standard optical fiber 1 and each high relative refractive-index difference optical fiber 2 in the accommodating member 30C, each standard optical fiber 1 and each high relative refractive-index difference optical fiber 2 can be laid out in the accommodating member 30C with a high degree of freedom.

Furthermore, the optical connection component 100C can achieve, as with the above-described embodiments, downsizing and high reliability.

In addition, the length of the optical connection component 100C in the X direction can be downsized to a length of less than or equal to 20 mm. The optical connection component 100C does not cause the deterioration of the resin sheath even in a high-temperature environment. If there is a possibility of being exposed to a high-temperature environment, it is preferable that the adhesive used have high heat resistance as in the foregoing. Such an accommodating member 30C can be fabricated in the same manner as the accommodating member 30A in the second embodiment.

Fifth Embodiment

Figure 9:
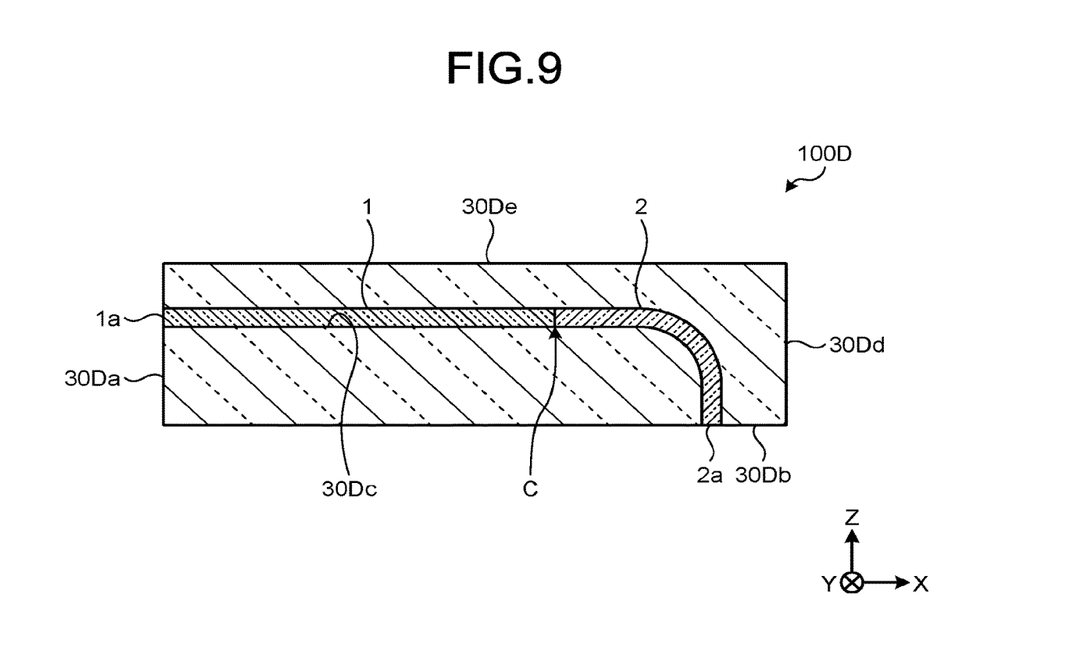
FIG. 9 is a schematic cross-sectional view of an optical connection component according to a fifth embodiment.

FIG. 9 is a schematic cross-sectional view of an optical connection component according to a fifth embodiment. An optical connection component 100D includes a plurality of standard optical fibers 1, a plurality of high relative refractive-index difference optical fibers 2 as many as the standard optical fibers 1, and an accommodating member 30D. Each standard optical fiber 1 and each high relative refractive-index difference optical fiber 2 are glass optical fibers having no resin sheath, and one end face of each standard optical fiber 1 and one end face of each high relative refractive-index difference optical fiber 2 are fusion-spliced at the fusion-splicing point C.

The accommodating member 30D is a block body having a rectangular parallelepiped shape and is made of resin, glass, ceramic, and the like, for example. The accommodating member 30D is substantially parallel to the Y-Z plane and has a first end face 30Da and an opposing end face 30Dd facing each other. Furthermore, the accommodating member 30D is substantially parallel to the X-Y plane and has a second end face 30Db and an opposing end face 30De facing each other. In addition, the accommodating member 30D is opened to a first end face 30Da and the second end face 30Db and has a plurality of accommodating holes 30Dc that are juxtaposed in the Y direction. In this case, each accommodating hole 30Dc first extends in the X direction from the first end face 30Da, bends on the negative side of the Z direction on the way, and reaches the second end face 30Db that is nonparallel to and substantially orthogonal to the first end face 30Da. The number of the accommodating holes 30Dc is equal to or greater than the number of the standard optical fibers 1 or the number of the high relative refractive index difference optical fibers 2.

Each standard optical fiber 1 and each high relative refractive-index difference optical fiber 2 that are fusion spliced are accommodated in each accommodating hole 30Dc by insertion and the like, and the entire lengths thereof are accommodated in the accommodating member 30D. Each standard optical fiber 1 and each high relative refractive-index difference optical fiber 2 are fixed with an adhesive and the like filled in a slight gap between the inner wall of each accommodating hole 30Dc and the outer peripheral surfaces of each standard optical fiber 1 and each high relative refractive-index difference optical fiber 2. That is, each standard optical fiber 1 and each high relative refractive-index difference optical fiber 2 are fixed to the accommodating member 30D in the longitudinal direction. In this case, because each accommodating hole 30Dc is bent, at least one of each standard optical fiber 1 and each high relative refractive-index difference optical fiber 2 is also bent accordingly. In the fifth embodiment, it is configured such that each high relative refractive-index difference optical fiber 2 for which the bending radius at which bending loss occurs is smaller is bent. As a result, the curvature radius of the bend can be made small, making it suitable for downsizing the optical connection component 100D.

The end face 1a of each standard optical fiber 1 is exposed on the first end face 30Da so as to be substantially flush therewith. The end face 2a of each high relative refractive-index difference optical fiber 2 is exposed on the second end face 30Db so as to be substantially flush therewith. As in the foregoing, each end face 1a and each end face 2a are substantially orthogonal to each other.

If this optical connection component 100D is used, each optical fiber of a multi-core optical fiber core wire with connector can be connected to each silicon waveguide of a silicon waveguide chip at a low connection loss and the connection loss can be made to be less than or equal to 1 dB, for example. In addition, because each end face 1a and each end face 2a are substantially orthogonal to each other, the optical connection component 100D also has a function of connection direction conversion. For example, some silicon waveguides have a diffraction grating formed at the end portion and output the guiding light in an upward direction orthogonal to the waveguide direction. The optical connection component 100D can, by arranging it such that each end face 2a of the second end face 30Db is located above the portion where the light of such a silicon waveguide chip is output, receive the light output by the silicon waveguide chip and transmit it to the side of the multi-core optical fiber core wire with connector.

In the fifth embodiment, each high relative refractive-index difference optical fiber 2 is bent so as to change its longitudinal direction by approximately 90 degrees, but the angle of the bend is not limited to 90 degrees. As just described, when accommodating the entire lengths of each standard optical fiber 1 and each high relative refractive-index difference optical fiber 2 in the accommodating member 30D, each standard optical fiber 1 and each high relative refractive-index difference optical fiber 2 can be laid out in the accommodating member 30D with a high degree of freedom.

Furthermore, the optical connection component 100D can achieve, as with the above-described embodiments, downsizing and high reliability.

In addition, the optical connection component 100D may have the distance between the first end face 30Da and the opposing end face 30Dd set to be less than or equal to 20 mm and the distance between the second end face 30Db and the opposing end face 30De set to be less than or equal to 20 mm. That is, the optical connection component 100D can be downsized to a length of less than or equal to 20 mm in the X direction and the Z direction. The optical connection component 100D does not cause the deterioration of the resin sheath even in a high-temperature environment. If there is a possibility of being exposed to a high-temperature environment, it is preferable that the adhesive used have high heat resistance as in the foregoing. Such an accommodating member 30D can be fabricated in the same manner as the accommodating member 30A in the second embodiment.

Note that, in the above-described embodiments, all the standard optical fibers 1 accommodated in each accommodating member have been located on the negative side of the X direction and all the high relative refractive-index difference optical fibers 2 have been located on the positive side of the X direction. Hereinafter, this will be referred to as a first-array optical fiber pair. However, the present disclosure is not limited thereto, and in the accommodating member, in addition to the first-array optical fiber pairs, one or more of second-array optical fiber pairs in which the standard optical fiber 1 is located on the positive side of the X direction and in which the high relative refractive-index difference optical fiber 2 is located on the negative side of the X direction may be included. For example, in the accommodating member, the first-array optical fiber pairs and the second-array optical fiber pairs may be arrayed alternately in the Y direction. Furthermore, in the accommodating member, one or more of the first-array optical fiber pairs may be arranged on the positive side of the Y direction and one or more of the second-array optical fiber pairs may be arranged on the negative side of the Y direction.

In addition, the standard optical fiber 1 and the high relative refractive-index difference optical fiber 2 may be accommodated in the accommodating member so as to form a U-shape. In this case, the first end face where the end face 1a is exposed and the second end face where the end face 2a is exposed are an identical end face.

Furthermore, in the accommodating member, in addition to the first-array optical fiber pairs or the second-array optical fiber pairs, an optical fiber the entire length of which is the standard optical fiber 1 or the high relative refractive-index difference optical fiber 2 may be accommodated such that each end face of the accommodated optical fiber is exposed on the first end face and the second end face of the accommodating member so as to be substantially flush therewith, and fixed in the accommodating member in the longitudinal direction.

In the above-described embodiments, a plurality of standard optical fibers 1 and a plurality of high relative refractive-index difference optical fibers 2 have been accommodated in each accommodating member, but the present disclosure is not limited thereto, and an optical fiber pair made up of a single standard optical fiber 1 and a single high relative refractive-index difference optical fiber 2 may be accommodated. In the above-described embodiments, the optical fiber and the high relative refractive-index difference optical fiber have been glass optical fibers having no resin sheath, but the present disclosure is not limited thereto, and the resin sheath may be formed at least a part of the optical fiber or the high relative refractive-index difference optical fiber in the longitudinal direction.

The present disclosure is not intended to be limited by the above-described embodiments. The preset disclosure also includes those configured by combining the constituent elements of each of the above-described embodiments as appropriate. Further effects and modifications can be readily derived by those skilled in the art. Therefore, the broader aspects of the present disclosure are not limited to the above-described embodiments, and various modifications are possible.

The present application can be applied to a connection between an optical fiber and a high relative refractive-index difference optical fiber According to the present disclosure, it has an effect in that an optical connection component that achieves both downsizing and high reliability at the same time can be provided.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical connection component comprising:
a plurality of optical fibers, each of which has no resin sheath over an entire length of the optical fiber;
a plurality of high relative refractive-index difference optical fibers, each of which is fusion-spliced to a respective optical fiber, the high relative refractive-index difference optical fibers each having a greater relative refractive-index difference to a cladding of a core than the respective fusion-spliced optical fiber, the high relative refractive-index difference optical fibers having no resin sheath over an entire length of the high relative refractive-index difference optical fiber; and
an accommodating member configured to accommodate entire lengths of the optical fibers and the high relative refractive-index difference optical fibers, the accommodating member having a first end face on which end faces of the optical fibers on a side opposite to a side of the fusion-spliced are exposed to be substantially flush with the first end face, and a second end face on which end faces of the high relative refractive-index difference optical fibers on a side opposite to the side of the fusion-spliced are exposed to be substantially flush with the second end face, wherein
the accommodating member includes a fixing member having a first member having V-grooves on which the optical fibers or the high relative refractive-index difference optical fibers are placed and a second member configured to clamp the optical fibers or the high relative refractive-index difference optical fibers between the first member and the second member,
an end face of the first member and an end face of the second member constitute the first end face or the second end face,
the accommodating member includes a ferrule having accommodating holes in which the optical fibers or the high relative refractive-index difference optical fibers are accommodated,
the end face of the first member abuts a bottom surface of the ferrule such that the ferrule and the fixing member are fitted together,
the optical fibers and the high relative refractive-index difference optical fibers are fixed to the accommodating member in a longitudinal direction, and
the accommodating member is made of quartz-based glass.

2. The optical connection component according to claim 1, wherein the accommodating member is made up of a block body having accommodating holes in which the optical fibers and the high relative refractive-index difference optical fibers are accommodated.

3. The optical connection component according to claim 1, wherein the accommodating member has an opposing end face which is opposite to the first end face or the second end face, and a distance between the first end face or the second end face and the opposing end face is less than or equal to 20 mm.

4. The optical connection component according to claim 1, wherein at least one of the high relative refractive-index difference optical fibers is bent inside the accommodating member.

5. The optical connection component according to claim 1, wherein the first end face and the second end face are not parallel to each other.

\* \* \* \* \*